(12) United States Patent
D'Alascio et al.

(10) Patent No.: US 9,242,713 B2
(45) Date of Patent: Jan. 26, 2016

(54) AERODYNAMIC, BLUNT AFT BODY

(71) Applicant: AIRBUS HELICOPTERS DEUTSCHLAND GMBH, Donauworth (DE)

(72) Inventors: Alessandro D'Alascio, Haar (DE); Sebastian Mores, Munich (DE); Frederic Le Chuiton, Munich (DE); Marius Bebesel, Munich (DE); Qinyin Zhang, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 251 days.

(21) Appl. No.: 13/944,144

(22) Filed: Jul. 17, 2013

(65) Prior Publication Data

US 2014/0131517 A1    May 15, 2014

(30) Foreign Application Priority Data

Jul. 26, 2012   (EP) .................................... 12400029

(51) Int. Cl.
B64C 23/06 (2006.01)
B64C 27/04 (2006.01)
B64C 1/00 (2006.01)

(52) U.S. Cl.
CPC .............. B64C 1/0009 (2013.01); B64C 23/06 (2013.01); B64C 27/04 (2013.01); Y02T 50/12 (2013.01); Y02T 50/162 (2013.01)

(58) Field of Classification Search
CPC ..................... B64C 1/0009; B64C 2001/0045; B64C 23/06
See application file for complete search history.

(56) References Cited

U.S. PATENT DOCUMENTS

| 3,384,326 | A | * | 5/1968 | Neubeck ......................... 244/13 |
| 3,419,232 | A | | 12/1968 | McStay et al. |
| 3,544,047 | A | * | 12/1970 | Gabriel ...................... 244/17.11 |
| 4,736,913 | A | | 4/1988 | Bennett et al. |
| 4,786,009 | A | | 11/1988 | Rao et al. |
| 5,069,402 | A | | 12/1991 | Wortman |
| 5,209,430 | A | | 5/1993 | Wilson et al. |
| 5,209,431 | A | | 5/1993 | Bernard et al. |
| 6,957,792 | B2 | * | 10/2005 | Saiz ................................ 244/36 |
| 7,686,245 | B2 | | 3/2010 | Heminway |

(Continued)

FOREIGN PATENT DOCUMENTS

WO   2004022215 A2   3/2004

OTHER PUBLICATIONS

Search Report and Written Opinion; Application No. EP 12400029; dated Jan. 28, 2013.
KR 10-2013-0069165 Notice of the Reason for Rejection in corresponding Korean Application; dated Feb. 24, 2015; 5 pages.

(Continued)

*Primary Examiner* — Tien Dinh
*Assistant Examiner* — Richard R Green
(74) *Attorney, Agent, or Firm* — Brooks Kushman P.C.

(57) ABSTRACT

An aerodynamic blunt aft body (10) of a helicopter fuselage with two strakes (7, 8) along an aft surface (9) and/or respective left hand and right hand side fuselage surfaces (5, 6). Each strake (7, 8) is defined by first and second intersection lines (3, 4) resulting from intersections of horizontal planes (z) with the surface of the aft surface (9) or the respective left hand and right hand side fuselage surfaces (7, 8). The strakes are defined by a two or three dimensional spline (12) from the surface (2) towards the aft surface (9) inside said first and second intersection lines (3, 4) and inside the bounding box (15).

17 Claims, 3 Drawing Sheets

(56) References Cited

U.S. PATENT DOCUMENTS

| | | |
|---|---|---|
| 8,783,617 B2 * | 7/2014 | Harbeck et al. ............... 244/130 |
| 2009/0078830 A1 | 3/2009 | Fol et al. |
| 2012/0049001 A1 * | 3/2012 | Smith et al. ................... 244/130 |

OTHER PUBLICATIONS

KR 10-2013-0069165 Notice of the Reason for Rejection in corresponding Korean Application; dated Feb. 24, 2015; 3 pages—English Translation.

* cited by examiner

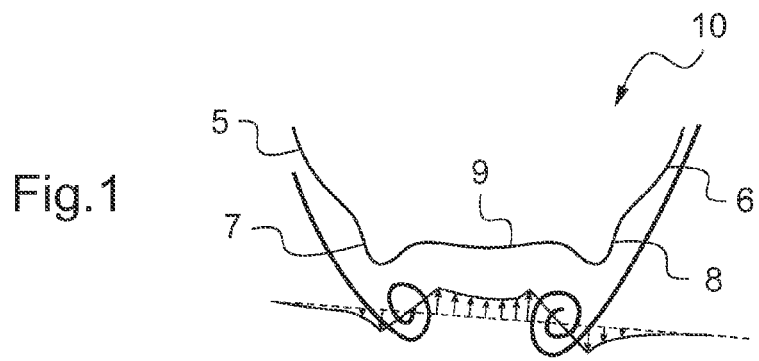
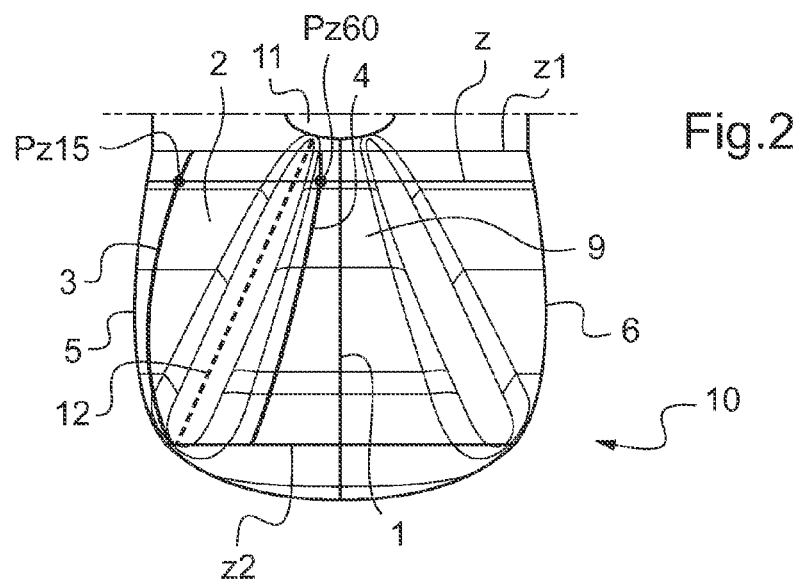
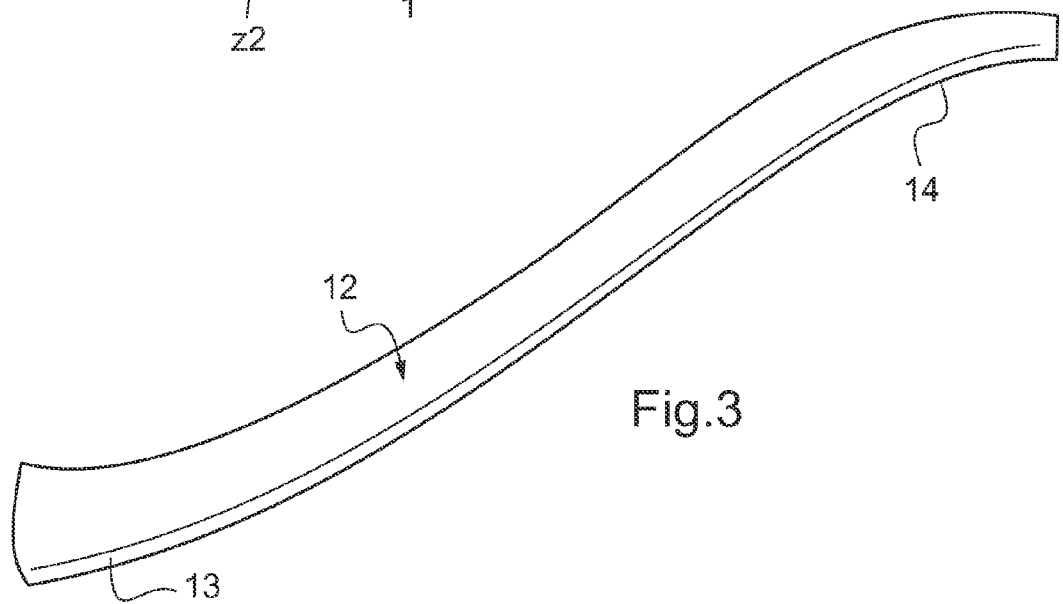

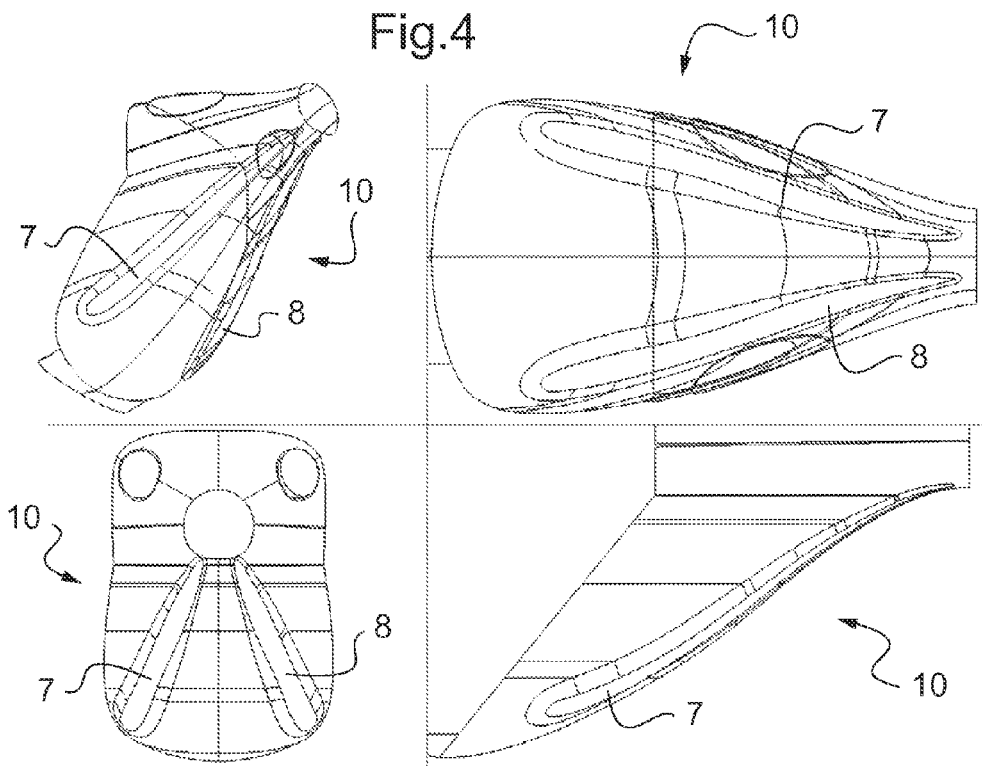
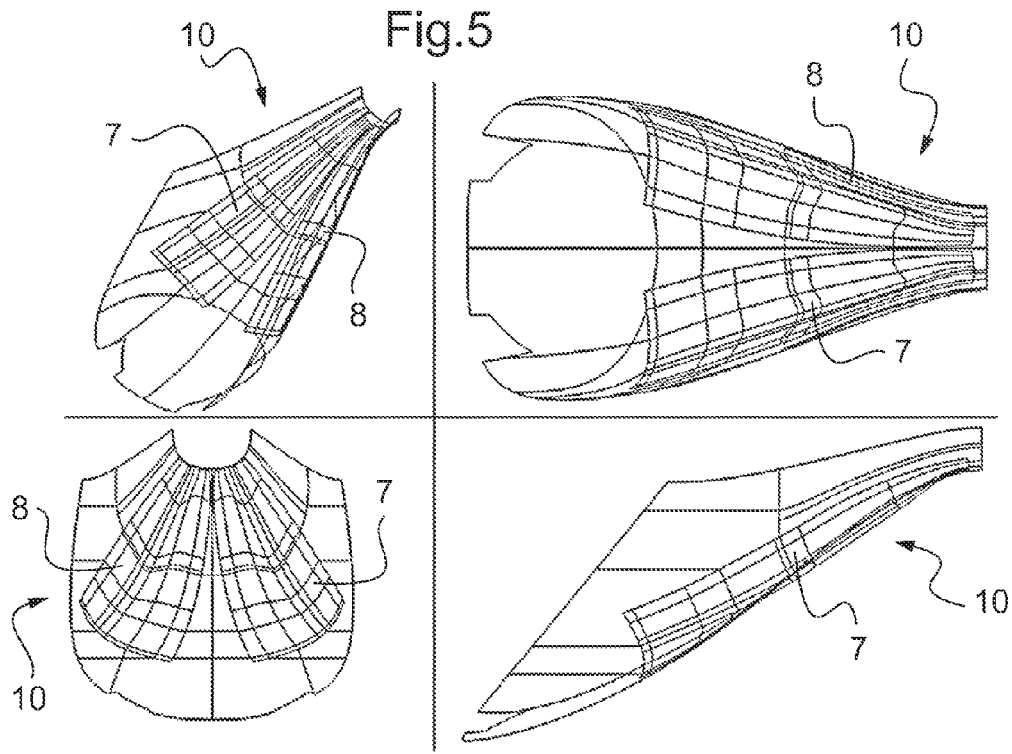

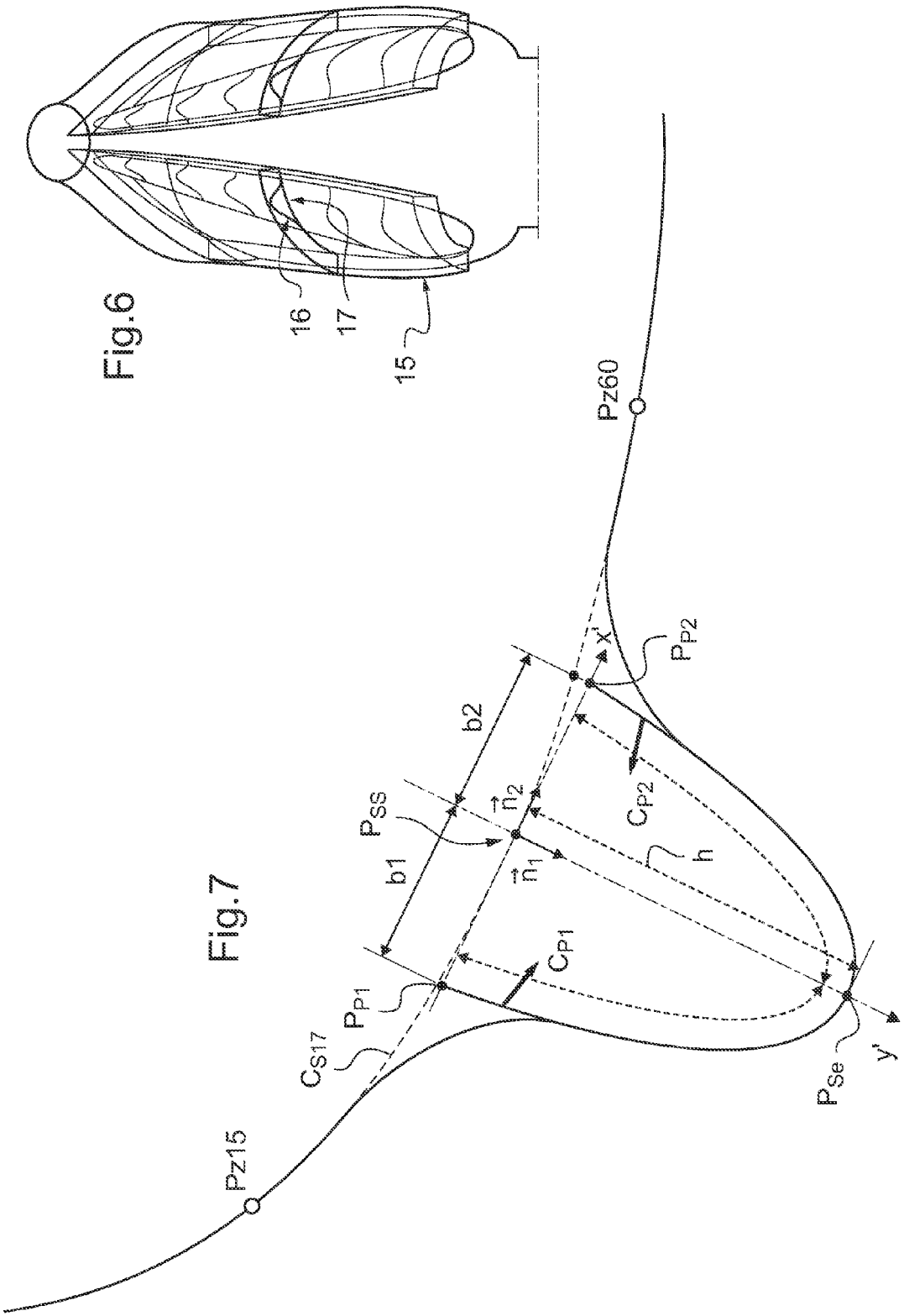

AERODYNAMIC, BLUNT AFT BODY

CROSS REFERENCE TO RELATED APPLICATIONS

This application claims priority to European application No. 12 400029.0 filed Jul. 26, 2012, the disclosure of which is incorporated in its entirety by reference herein.

BACKGROUND OF THE INVENTION (1) Field of the Invention

The invention is related to an aerodynamic, blunt aft body, particularly an aerodynamic, blunt aft body of a helicopter with a rear loading capability according to the preamble of claim 1. The upsweep angle of the rear part of the helicopter fuselage is defined by the angle between the lowest tangential z-plane of the fuselage midsection and the tangential planes with the fuselage midsection. An aft body is blunt, when the maximum of the said upsweep angle is greater than 25°.

(2) Description of Related Art

The aerodynamics of helicopters with fuselages featuring a blunt aft body, e.g. fuselages featuring a backdoor or a ramp/hatch with rear loading capabilities, are characterized by flow separation in the blunt aft body region, said flow separation being the main source of fuselage drag. Improving the flow by reducing as much as possible the separation region on the blunt aft body to weaken the turbulence in this region, can noticeably reduce drag of the aircraft and hence required power and fuel consumption of the helicopter can be reduced.

The installation of so called strakes is known to reduce the drag of cambered rear loading aft bodies of airplanes. However, helicopters do indeed fly often at flow conditions with side-slip angles much higher than the ones airplanes experience. For those high side-slip angles the flow separates upstream of the strakes. In these cases, the fuselage drag is no longer reduced, but can even increase.

The document US 2009/0078830 A (Airbus) discloses a surface including a geometrical deformation configured to generate lateral aerodynamic disturbances on the central fairing to control the flow of air. This patent does neither deal with helicopters nor with reducing separated flows, nor with lateral stability.

The document U.S. Pat. No. 4,786,009 A (NASA) discloses a method and apparatus for controlling yaw and pitch at high angles of attack by controlling the vortex pattern around the forebodies of air vehicles by means of deflecting strakes. This patent does not deal with drag reduction of blunt aft bodies. In fact these deflecting strakes generate control moments around the pitch and yaw axis by increasing the fuselage sectional forebody drag. Considering the local flow condition around the fuselage forebody the strakes act as spoilers, being placed transversally with respect to the air flow.

The document U.S. Pat. No. 5,209,430 A discloses the use of strakes on helicopters to spoil the airflow on the tail boom so that less side thrust is needed from the tail rotor. It is not dealing with blunt fuselages.

The document U.S. Pat. No. 7,686,245 discloses a download alleviation strake on a rotary aircraft said strake extending at least partially along a length of the fuselage and configured to reduce a downwash download during operation of the rotor assembly. There is no hint to drag reduction or lateral stability.

BRIEF SUMMARY OF THE INVENTION

It is an object of the invention to reduce the drag of helicopters with blunt aft bodies.

The solution is provided with an aerodynamic blunt aft body of a helicopter fuselage with the features of claim 1. Preferred embodiments of the invention are presented with the subclaims.

According to the invention an aerodynamic blunt aft body of a helicopter fuselage with a longitudinal middle plane comprises left hand and right hand side fuselage surfaces essentially parallel to said longitudinal middle plane and an aft surface between said left hand and right hand fuselage surfaces with an essentially normal alignment of said aft surface to said longitudinal middle plane. A left hand side strake and a right hand side strake are provided along said aft surface and/or along the respective left hand and right hand side fuselage surfaces. Said strakes are smooth three-dimensional protruding geometries, essentially surface bumps. Said strakes are mounted directly on said surface or they are integral parts of said surface Said strakes are essentially a mirror image of each other with respect to said longitudinal middle plane. Each of said strakes is limited in the vertical direction by the curves resulting from intersections of horizontal planes $z1$ and $z2$ with the surface of the aerodynamic blunt aft body or the respective left hand and right hand side fuselage surfaces.

The helicopter width is defined as the maximum distance measured orthogonally to the helicopter midplane between the respective left hand and right hand side fuselage surfaces. The horizontal planes $z1$ and $z2$ are normal to the longitudinal middle plane of the helicopter, with $z1$ being placed horizontally at the junction between tailboom and aft body and $z2$ being placed at 10% of the helicopter width above the lowest horizontal station (waterline) of the fuselage cabin.

The first intersection line is defined by lateral points $Pz15$ resulting from intersections of the fuselage side surface with a local tangent lying in plane z moving from $z1$ to $z2$ at an angle of 15° relative to the middle plane. The second intersection line is defined by inner points $Pz60$ resulting from said intersections with a local tangent lying in plane z at an angle of 60° relative to the middle plane. A connecting surface is defined to fill the gap between said first and second intersection lines, where tangential continuity at said first intersection line 3 to said fuselage side surface and tangential continuity at said second intersection line 4 to said aft surface are given.

A bounding box is defined by said connecting surface and an offset of it by 13%+/−7% of said fuselage width outward of said left hand side fuselage surface. The said strakes are defined as surface bumps on the fuselage surfaces, which are generated by lofting a two or three dimensional spline inside said bounding box with loft surfaces being surfaces generated by 2D and/or 3D curves creating a smooth tangency between the selected curves. The loft surface can be made to respect one or more guide curves. Every intersecting curve of the aft body surface with the horizontal planes z lies within the intersecting curve of the bounding box with z. The left and right strakes of the inventive aerodynamic blunt aft body are integrated or mounted longitudinally to the surface of the aft body essentially as a mirror image of each other with respect to the longitudinal middle plane of the fuselage cabin to avoid that any surface flow separates along the left and right side of the aft body.

The two strakes of the inventive aerodynamic blunt aft body are positioned such as to cover the locations of any separation lines and are beginning shortly upstream of any such separation lines. The invention is effective on fuselages experiencing flow separation in the aft body region of helicopters, as the longitudinal strakes of the inventive aerodynamic blunt aft body force the air flows from the left and the right side and from the bottom to generate two distinct, longitudinal, counter rotating vortices causing the surface flow to remain attached longer to the inventive aerodynamic blunt aft body, e.g. the backdoor of the helicopter. In fact, each of the two vortices, conditioned by the inventive aerodynamic blunt aft body, induces a velocity between them, which is directed orthogonally to the vortex axis towards the backdoor surface. Due to the counter rotating directions of the vortices, these induced velocity components sum up in the region comprised between the vortices with a consequence that the induced flow allows for a higher pressure recovery on the inventive aerodynamic blunt aft body.

Another favorable effect is the improved stability of the global flow pattern since the strakes of the inventive aerodynamic blunt aft body ensure the formation of the vortices at a well-defined position, relatively independent of the flight attitude of the helicopter. The flow induced by the strakes of the invention allows for a higher pressure recovery on the aft body geometry. Additionally, the installation of the strakes of the inventive aerodynamic blunt aft body provides less flow deceleration and an improvement in directional stability. Overall, with the strakes of the inventive aerodynamic blunt aft body, the extent of the flow separation on the aft body is reduced and thus total pressure losses in the wake are minimized. Therefore the tail unit of the helicopter experiences a less turbulent flow and can thus achieve a higher aerodynamic efficiency.

According to a preferred embodiment of the invention the aerodynamic blunt aft body is provided with a tail boom, said tail boom having a transition to said strakes.

According to a further preferred embodiment of the invention said aft surface is provided with a rear loading capability.

According to a further preferred embodiment of the invention said strakes are blended through a variable fillet for a smooth transition to the aft surface.

BRIEF DESCRIPTION OF THE SEVERAL VIEWS OF THE DRAWINGS

A preferred embodiment of the invention is presented with reference to the following description and to the attached drawings.

FIG. 1 shows a horizontal z-cut through the blunt aft body with velocity vectors induced by vortices from the left and right side of the fuselage and from the bottom side of an aerodynamic blunt aft body according to the invention, FIG. 2 shows a rear view of the aerodynamic blunt aft body according to the invention, FIG. 3 shows a strake of an aerodynamic blunt aft body according to the invention, FIG. 4 shows perspective views of an embodiment of the aerodynamic blunt aft body according to the invention, FIG. 5 shows perspective views of a further embodiment of the aerodynamic blunt aft body according to the invention, FIG. 6 shows a perspective view of the box bounding or limiting the strake geometries with horizontal z-cuts, and FIG. 7 shows a detailed view of one of the horizontal z-cuts through the strake on the aerodynamic blunt aft body according to the invention.

DETAILED DESCRIPTION OF THE INVENTION

According to FIG. 1 an aerodynamic blunt aft body 10 of a fuselage of a helicopter (not shown) comprises a left hand side fuselage surface 5 and a right hand side fuselage surface 6 which are essentially parallel to said longitudinal middle plane 1. A left hand side strake 7 is arranged between said left hand side fuselage surface 5 and an aft surface 9 and a right hand side strake 8 is arranged between said aft surface 9 and said right hand side fuselage surface 6. Said strakes 7, 8 are local surface obstacles, i.e. three-dimensional bumps, placed transversally with respect to any side flows and longitudinally to the bottom flow. Therefore said strakes 7, 8 act as "spoilers" for the side flows and as "flow deviators" for the non longitudinal bottom flow. Said strakes 7, 8 are integral with the fuselage or mounted to the surfaces of the fuselage.

Said left hand side strake 7 and said right hand side strake 8 are respectively integral with said fuselage side surfaces 5, 6 and said aft surface 9.

At forward flight of the helicopter the air flow along the fuselage generates two vortices along the aft surface 9. Said two vortices, conditioned by the aerodynamic blunt aft body 10 of the helicopter at forward flight, induce a velocity between them, which is directed orthogonally to the vortex axis towards the aft surface 9.

According to FIG. 2 corresponding features are referred to with the references of FIG. 1. The helicopter comprises a longitudinal middle plane 1 intersecting the aerodynamic blunt aft body 10 into two essentially symmetric halves. The left hand and right hand side fuselage surfaces 5, 6 are essentially parallel to said longitudinal middle plane 1. The aft surface 9 between said left hand and right hand fuselage surfaces 5, 6 is essentially a normal alignment to said longitudinal middle plane 1. A tail boom 11 of said helicopter is arranged at a top end in the middle of the aft surface 9.

As the two strakes 7, 8 are essentially mirrored images of each other with respect to said longitudinal middle plane 1, only the features of the left hand side strake 7 are described as an example as well for the right hand side strake 8. The left hand side strake 7 is limited by first and second intersection lines 3, 4 resulting from intersections of horizontal planes z with said left hand fuselage surface 5 and said aft surface 9. The first intersection line 3 is defined by lateral points Pz15, resulting from said intersections, with a local tangent lying in plane z, varying z between z1 and z2, at an angle of 15° relative to the middle plane 1. The second intersection line 4 is defined by inner points Pz60 resulting from said intersections with a local tangent lying in plane z, varying z between z1 and z2, at an angle of 60° relative to the middle plane 1.

A surface 2 belonging to the aft body 10 bounded by said first and second intersection lines 3, 4 and the horizontal planes z1 and z2 is located within a bounding box 15 (see FIG. 6).

According to FIG. 3 corresponding features are referred to with the references of FIGS. 1, 2. A two or three dimensional spline 12 (strake edge curve) belonging to surface 2 towards the aft surface 9 inside said first and second intersection lines 3, 4 forms the left hand side strake 7 with a resulting intersection curve of the left hand side strake 7 with the aft surface 9 being blended through a variable fillet (not shown) for a smooth transition to the aft surface 9. The fillet has a larger radius of curvature of 7% (+/−7%) of the said fuselage width at the bottom 13 of the aft surface 9 and a smaller curvature radius of 3.5% (+/−3.5%) of the said fuselage width at the top 14.

According to FIG. 4 corresponding features are referred to with the references of FIGS. 1-3. A long and thin version of the strakes 7, 8 is shown with four different perspective views of an aerodynamic blunt aft body 10. This strake variant is comprised within the bounding-box 15 of FIG. 6.

According to FIG. 5 corresponding features are referred to with the references of FIGS. 1-3. A short and wide version of the strakes 7, 8 is shown with four different perspective views of an aerodynamic blunt aft body 10. This strake variant is comprised within the bounding box of FIG. 6.

According to FIG. 6 the bounding box 15 is limiting the surface 2. Surface 17 is a tangentially continuous fill surface between curves 3 and 4. Curve 16 is an intersection curve between a horizontal z-plane and the surface 2. Every z-cut of the bounding box 15 encloses the curve 16.

According to FIG. 7 an analytical description is given for a z-cut of surface 2. A strake skeleton curve lying in surface 17 is defined as the connecting curve between an arbitrary point lying between Pz15 and Pz60 on z1 and an arbitrary point lying between Pz15 and Pz60 on z2. For every point of the strake skeleton curve a point can be generated at a distance h which is 13% (−/−7%) of the said fuselage width in the surface normal direction of surface 17. By connecting these points the strake edge curve 12 is generated.

A Point Pss is a point of the strake skeleton curve and a point Pse is a point of the strake edge curve 12. A vector n1 is the projection of a surface normal vector of surface 17 at point Pss onto the z-plane. A vector n2 lying in z-plane is perpendicular to said vector n1. A local coordinate system x'-y' is built with the point (Pss) and the vectors (n1), (n2). The lengths b1 and b2 are 0.2% (+/−0.1%) of the said fuselage width. With the distances (b1) and (b2) on the x'-axis from the point (Pss), the points (Pp1) and (Pp2) are found. In the said local coordinate system, a parabola segment (Cp1) is built by passing through the Points (Pp1) and (Pse), while the point (Pse) possesses the maximal y'-value on the parabola. Similarly, another parabola segment (Cp2) is built by passing through the points (Pp2) and (Pse), while the point (Pse) possesses the maximal y'-value on the parabola. The curve (Cs17) is the intersection curve of the said surface 17 with the z-plane. Fillets with a radius of curvature of 7% (+/−7%) of said fuselage width are used for a smooth transition of the parabolas (Cp1) and (Cp2) into the curve (Cs2).

The point Pz of surface 17 for the actual blunt fuselage can be defined as a point lying on said plane (z) between the points (Pz15) and (Pz60) with the property that the local tangent of said fuselage side surface at (Pz) lying in the plane (z) has an angle $\alpha$ with the definition $\alpha=60°+(z-z1)/(z2-z1)*(15°-60°)$. By connecting these points one possible strake skeleton curve is generated. For every point of the strake skeleton curve, a point with a distance h (which is 13%+/−7% of the said fuselage width) in the surface normal direction of surface 17 can be generated. By connecting these points, the strake edge curve 12 is generated.

REFERENCE LIST 1 middle plan
2 surface
3 intersection line
4 intersection line
5 left hand side fuselage surface
6 right hand side fuselage surface
7 left hand side strake
8 right hand side strake
9 aft surface
10 aerodynamic blunt aft body
11 tail boom
12 strake edge curve
13 bottom side of the strake
14 top side of the strake
15 bounding box
16 intersection curve
17 fill surface

What is claimed is:

1. An aerodynamic blunt aft body of a helicopter fuselage with a longitudinal middle plane, the helicopter fuselage comprising left hand and right hand side fuselage surfaces essentially parallel to the longitudinal middle plane,
an aft surface between the left hand and right hand fuselage surfaces with an essentially normal alignment of the aft surface to the longitudinal middle plane, and
at least two stakes provided along the aft surface and/or the respective left hand and right hand side fuselage surfaces as an essentially mirrored image of each other with respect to the longitudinal middle plane, wherein each respective strake is defined by:
an upper plane normal to the longitudinal middle plane and passing through a junction between the aft surface and a tail boom,
a lower plane normal to the longitudinal middle plane and being placed at 10% of the helicopter width above the lowest horizontal station of the fuselage,
a first intersection line defined by a respective first set of points between the upper plane and the lower plane, wherein at the respective first set of points, local tangents to the respective surface lying in a horizontal plane are inclined at an angle of 15° relative to the central plane; and
a second intersection line defined by a respective second set of points between the upper plane and the lower plane, wherein at the respective second set of points, local tangents to the respective surface lying in a horizontal plane are inclined at an angle of 60° relative to the central plane;
each respective strake being defined within a respective bounding box with a height of 13% (+/−7%) offset relative to the fuselage width
with a two or three dimensional spline towards the aft surface inside the first and second intersection lines.

2. The aerodynamic blunt aft body according to claim 1, wherein the strake has a contour corresponding to the fuselage geometry without the strakes.

3. The aerodynamic blunt aft body according to claim 2, wherein every intersection curve of the strake with the respective horizontal planes lies within the bounding box.

4. The aerodynamic blunt aft body according to claim 1, wherein the tail boom has a transition to the strakes.

5. The aerodynamic blunt aft body according to claim 1, wherein the aft surface is provided with a rear loading capability.

6. The aerodynamic blunt aft body according to claim 1, wherein the two or three dimensional spline from the strake surface to the first and second intersection lines is blended through a variable fillet for a smooth transition to the aft surface.

7. The aerodynamic blunt aft body of claim 1, wherein a maximum upsweep angle associated with an aft portion of the fuselage is greater than 25 degrees.

8. A helicopter comprising:
a fuselage having a fore portion, an aft portion, a port portion with a port surface, and a starboard portion with a starboard surface, the aft portion being blunt, the fuselage additionally having a central plane extending from the fore portion to the aft portion, the central plane dividing the fuselage into the port portion and starboard portion, the fuselage further having a fuselage width and a lowest horizontal station;
a tail boom coupled to and extending from the fuselage;
a port strake coupled to the port surface by a first spline, the first spline extending to a region defined by:
an upper plane extending normal to the central plane and passing through a connection point between the tail boom and the fuselage;

a lower plane extending normal to the central plane and being positioned at 10% of the helicopter width above the lowest horizontal station;

a port inner intersection line defined by a first set of points between the upper plane and the lower plane, wherein at the first set of points, local tangents to the port surface lying in a horizontal plane are inclined at an angle of 15° relative to the central plane; and a port outer intersection line defined by a second set of points between the upper plane and the lower plane, wherein at the second set of points, local tangents to the port surface lying in a horizontal plane are inclined at an angle of 60° relative to the central plane; and a starboard strake coupled to the starboard surface by a second spline, the second spline extending to a region defined by:

the upper plane;

the lower plane;

a starboard inner intersection line defined by a third set of points between the upper plane and the lower plane, wherein at the third set of points, local tangents to the port surface lying in a horizontal plane are inclined at an angle of 15° relative to the central plane; and a starboard outer intersection line defined by a fourth set of points between the upper plane and the lower plane, wherein at the fourth set of points, local tangents to the starboard surface lying in a horizontal plane are inclined at an angle of 60° relative to the central plane.

9. The helicopter of claim 8, wherein the port strake extends from the port surface to a height of 13% (+/−7%) relative to the fuselage width and the starboard strake extends from the starboard surface to a height of 13% (+/−7%) relative to the fuselage width.

10. The helicopter of claim 8, wherein the port strake and the starboard strake are coupled to the aft portion of the fuselage.

11. The helicopter of claim 8, wherein the first spline and the second spline are two- or three-dimensional splines.

12. The helicopter of claim 8, wherein the first spline is blended to the port surface by a first variable fillet and the second spline is blended to the starboard surface by a second variable fillet.

13. The helicopter of claim 8, wherein the aft portion includes a back loading door or back hatch for rear loading of the helicopter.

14. A helicopter fuselage having a fore portion, an aft portion, a central plane extending from the fore portion to the aft portion and dividing the fuselage into a port portion and a starboard portion, the fuselage comprising:

a port surface on the port portion of the fuselage;

a starboard surface on the starboard portion of the fuselage; and first and second strakes coupled to the fuselage at corresponding locations on opposite sides of the central plane, the first strake being provided on the port surface and the second strake being provided on the starboard surface, each respective strake of the first strake and second strake being defined by:

an upper plane extending normal to the central plane and passing through a connection point between a tail boom and the fuselage;

a lower plane extending normal to the central plane and being positioned at 10% of the helicopter width above the lowest horizontal station;

a respective inner intersection line defined by a respective first set of points between the upper plane and the lower plane, wherein at the respective first set of points, local tangents to the respective surface lying in a horizontal plane are inclined at an angle of 15° relative to the central plane; and a respective outer intersection line defined by a respective second set of points between the upper plane and the lower plane, wherein at the respective second set of points, local tangents to the respective surface lying in a horizontal plane are inclined at an angle of 60° relative to the central plane;

each respective strake projecting from the fuselage at a height of 13% (+/−7%) relative to the fuselage width, each respective strake being joined to the respective inner intersection line and the respective outer intersection line by a respective two- or three-dimensional spline.

15. The fuselage of claim 14, wherein the first strake and the second strake are coupled to the aft portion.

16. The fuselage of claim 4, wherein each respective spline is blended to the fuselage by a respective variable fillet.

17. The fuselage of claim 14, wherein the aft portion includes a back loading door or back hatch for rear loading of the helicopter.

* * * * *